May 28, 1957 E. L. HALL ET AL 2,794,163
SPEED GOVERNOR FOR ELECTRIC MOTOR
Filed Aug. 4, 1955 2 Sheets-Sheet 1
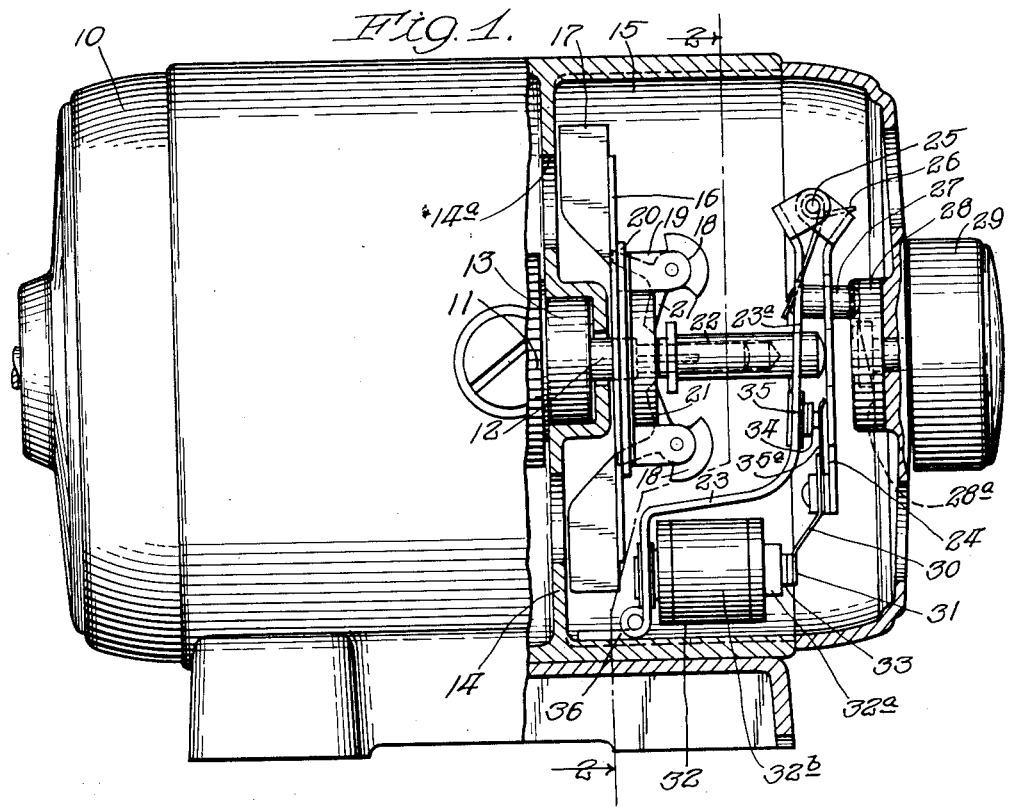
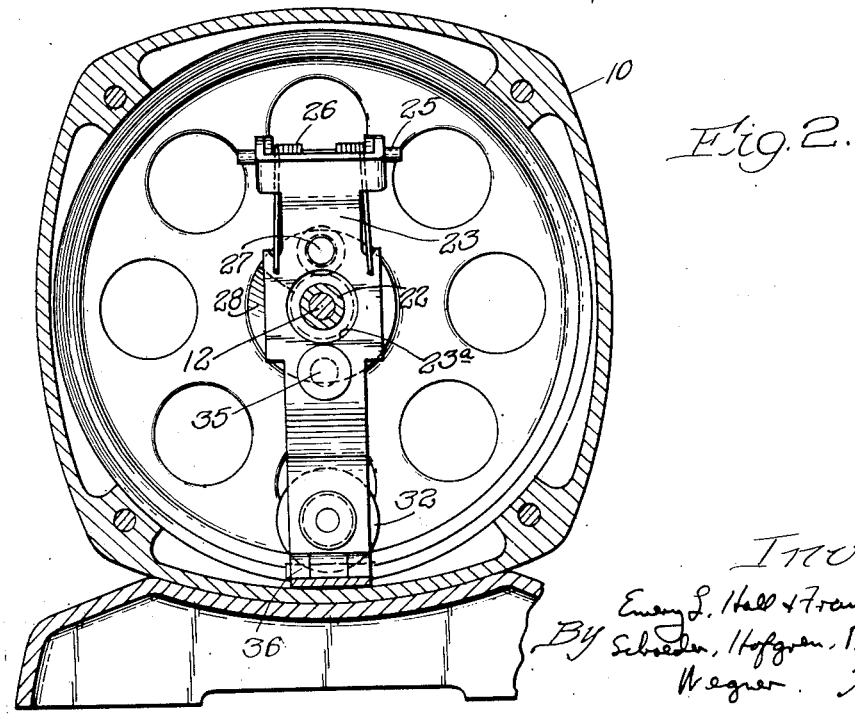
Inventors
Emery L. Hall & Francis E. Pratt
BY Schroeder, Hofgren, Brady & Wegner

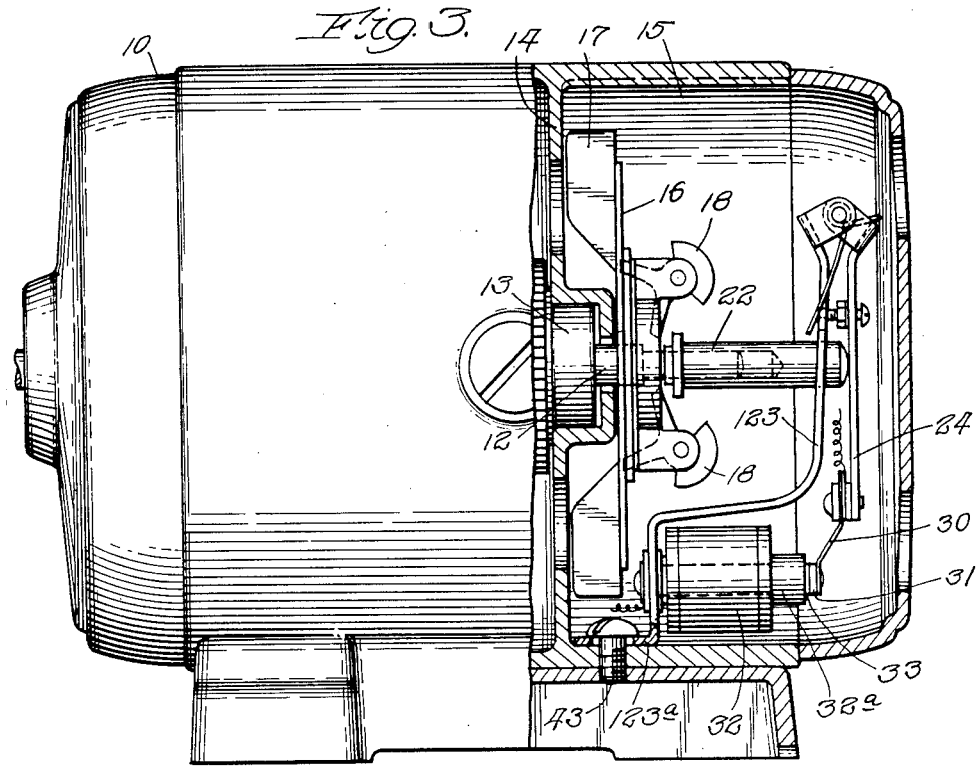
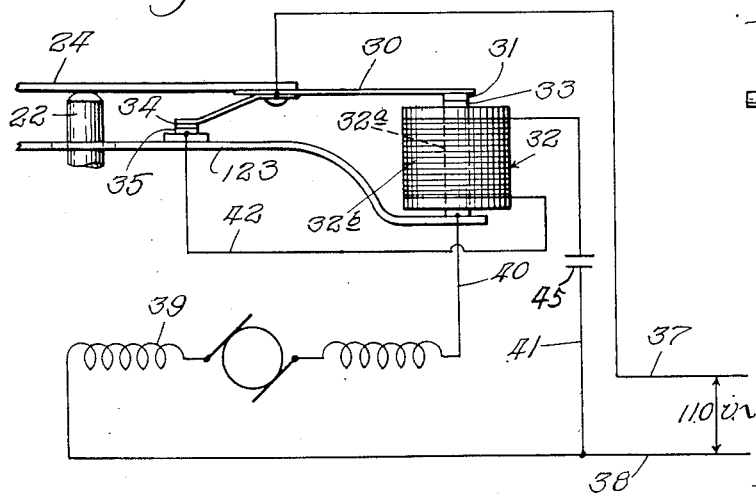
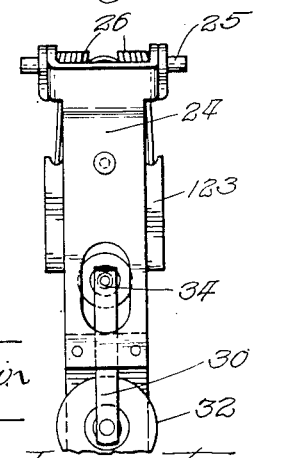

United States Patent Office 2,794,163
Patented May 28, 1957

2,794,163

SPEED GOVERNOR FOR ELECTRIC MOTOR

Emery L. Hall, Hinsdale, and Francis E. Pratt, Deerfield, Ill., assignors to Birtman Electric Company, a corporation of Illinois Application August 4, 1955, Serial No. 526,385

13 Claims. (Cl. 318—325)

This invention relates to a speed control apparatus for an alternating current electric motor.

The speed controls for electric motors often include a movable speed responsive member and a switch including a pair of contacts operatively associated with the speed responsive member for opening and closing the electric circuit to the motor at a predetermined speed on opening and closing these contacts. This type of apparatus is successful in controlling the speed of the motor, but has certain disadvantages. Thus, there is ordinarily considerable sparking with consequent wear on the contact points. This excessive sparking may be caused if a large air gap between the contacts is used, if the current or voltage is large, and if transient voltages are present caused by the commutation.

In order to overcome these disadvantages, it has been proposed in the past to use a electromagnet in series with the contacts and with the motor to hold the contacts closed until the sine wave of alternating current reaches the zero point. Such a construction, however, has been found to be impractical as it will not work successfully over a range of currents and a range of speeds. The construction will work quite well on a predetermined single speed, but not otherwise. As in this former construction the electromagnet coil is in series with the motor, the current flowing through the coil must be large if the demand on the motor is heavy. Thus, as the load goes up, the holding force of the magnet increases along with it. This causes uneven operation over varying loads and varying speeds and the contacts open and close without restriction so that destructive arcing of the contacts occurs.

One of the features of this invention is to provide a speed control apparatus wherein smooth operation and relatively slight arcing between the contacts are achieved over a wide range of speeds and a wide range of load conditions. In order to accomplish this, the apparatus of this invention comprises a pair of separable electric contacts operatively associated with a speed responsive member and mounted in electric series with the motor circuit for opening and closing the motor circuit at a predetermined speed on opening and closing the contacts in combination with an impedance structure including an electromagnet urging the contacts together, the electromagnet being in parallel circuit to the motor circuit with the impedance structure having an impedance such that the alternating current sine wave through the electromagnet reaches a predetermined point which may be the zero point, if desired, while the alternating current sine wave through the contacts is at a predetermined point which may be a descending point approaching zero. This causes the electromagnet to release the contacts so that they can open to control the motor speed.

With the construction of this invention, the contacts are permitted to open at a predetermined point caused by the operation of the speed responsive member which urges the contacts apart at a predetermined speed. Thus, the impedance circuit including the electromagnet utilizes line frequency to make and break the contacts at a predetermined rate and superimposes the period of operation of the governor on this rate. In the preferred structure, one of the contacts is mounted on a vibratory reed. When a large load is thrown on the motor, the pair of contacts stops the vibrating and remain in contact until the load conditions are satisfied and the motor attains its predetermined speed. By mounting one of the pair of contacts on the vibratory reed and the other contact on an electromagnet, only small amplitudes of vibration are required so that the drawing out of the arc between the contacts is kept at a minimum.

A more specific feature of the invention is to provide such an apparatus wherein the electromagnet is operatively associated with one contact and magnetically attracts a portion of the switch structure including the other contact so long as substantial current flows through the magnet, the vibratory spring serves to support the other contact and means are provided for separating the contacts to stop the operation of the motor while substantially simultaneously opening the circuit to the electromagnet.

Other features and advantages of the invention will be apparent from the following description of certain embodiments thereof as shown in the accompanying drawings. Of the drawings:

Figure 1 is a side elevational view, partially in section, of a motor and switch structure embodying the invention;

Figure 2 is a sectional elevation taken substantially along line 2—2 of Figure 1;

Figure 3 is a view similar to Figure 1, but showing an alternate embodiment of the invention;

Figure 4 is a rear elevational view of the switch structure of Figure 1;

Figure 5 is a semi-diagrammatic view illustrating the wiring diagram of the embodiment shown in Figures 1, 2, and 4.

The speed control apparatus illustrated herein is similar to that disclosed and claimed in C. H. Sparklin Patent 2,532,345, issued December 5, 1950. Thus, the embodiment illustrated includes a motor 10 including an armature 11 and a shaft 12 mounted adjacent to one end on a bearing 13.

The shaft 12 extends beyond a transverse wall 14 and into a chamber 15. Mounted on this extended end of the shaft is a rotatable plate 16 carrying spaced fan blades 17 for the circulation of air through the motor including a series of openings 14a in the wall 14.

The speed control apparatus is mounted on the plate 16 on the side opposite to the fan blades 17. This speed control is substantially the same as that shown in the above mentioned Patent 2,532,345. Thus, the speed control includes a pair of oppositely located bell cranks 18 mounted in brackets 19 substantially at right angles to the plate 16 and substantially aligned with each other along a diameter. As is explained in the above mentioned C. H. Sparklin patent, centrifugally responsive members within a housing 20 cause outward movement of the inner arms 21 on the bell cranks 18 with increasing speed of the motor. These arms are adapted to bear against a slidable member 22 so that increasing speed of the motor causes the member 22 to move outwardly away from the motor, or in a right-hand direction as shown in Figures 1 and 3.

The switch construction of this invention as illustrated in Figures 1, 2 and 4, comprises a pair of switch arms 23 and 24 arranged adjacent to each other and mounted for movement about a common fulcrum 25 located at one end of the arms. The arms are urged toward each other by spring means 26 engaging both arms.

The slidable member 22 extends through an opening 23a in the adjacent arm 23 and is adapted to bear against the other arm 24. This first arm 23 is provided with an outwardly-extending post 27 extending through an opening in the other arm 24 and bearing against the cam surface 28a of a substantially circular rotatable cam 28. The cam 28 is rotated by means of an exterior knob 29 so that rotation of the cam 28 acts upon the post 27 to rotate the switch around a hinge 36 and position the switch relative to the motor. As is explained in the above Patent 2,532,345, the motor operates at a higher speed the further the switch is from the motor.

The end of the arm 24 opposite the fulcrum 25 is provided with a strip 30 of spring steel. This steel strip has a natural vibratory frequency related to, and preferably substantially equal to the frequency of the alternating current with which the motor is operated. Thus, if the motor is intended for operation on 60 cycle alternating current, the steel strip 30 has a natural vibratory frequency of about 60 full cycles per second or 120 half-cycles per second when vibrating freely in space about one fixed end so that the contacts may close twice on each complete cycle of current.

One end of this spring steel strip is mounted on the end of the arm 24 and is insulated therefrom as by means of the usual rivets and insulating blocks. The other end of the strip 30 carries a contact point 31.

Mounted on the end of the switch arm 23 is an electromagnet 32 including an armature 32a and a field winding 32b. The end of the armature 32a carries a contact point 33 adapted to engage the contact point 31.

In the preferred construction, as illustrated in Figures 1, 2 and 4, there is also provided an auxiliary switch including a contact 34 mounted on the arm 24 and a cooperating contact 35 mounted on a steel strip 35a on the arm 23. These contacts 34 and 35 as well as the contacts 31 and 33 are so arranged that when the knob 29 is rotated to rotate the cam, the two sets of contacts separate when the arms 23 and 24 reach a position furthest from the adjacent end of the motor shaft. This corresponds to the "off" position and the circuit is broken substantially simultaneously through both sets of contacts.

As is shown in Figure 5, one electric lead 37 extends from one side of the current supply to the spring 30 and contact point 31. A second lead 38 extends from the other side of the electric supply to the series motor 39. The motor, in turn, is connected by a lead 40 to the armature 32a of the electromagnet 32 and to the other contact point 33. With this arrangement the contact point 31, contact point 33, armature 32a and motor 39 are in series with each other.

Another electric lead 41 extends from the lead 38 to one side of the field 32b of the electromagnet. The other side of the field is connected through a lead 42 to one of the contacts 35 on the auxiliary switch. The other contact 34 is electrically connected to the spring 30 which, in turn, is electrically connected to the lead 37. With this arrangement, the electromagnet 32 is across the current supply and is in series with the auxiliary switch contacts 34 and 35 and with the spring steel strip 30.

In order to produce the necessary impedance in the circuit including the electromagnet 32 so that the sine wave of electric current through the magnet reaches a predetermined point such as an approximate zero point while the alternating current sine wave through the contacts 31 and 32 and motor 39 is at a predetermined point such as a descending point approaching zero, it is convenient to first construct the electromagnet 32 with the desired reactance and then connect in series therewith an additional impedance in order to give the resulting impedance desired. Thus, in the embodiment shown, a condenser 45 is provided in series with the electromagnet. The capacity of the condenser is easily chosen by those skilled in the art so that the sine wave through this circuit will be at the predetermined point such as the zero point while the sine wave through the contacts 31 and 33 is at a predetermined point such as a descending point approaching zero. In one embodiment where the sine wave through this circuit was at approximately the zero point while the sine wave through the contacts 31 and 32 was at a descending point approaching zero and where the electromagnet had a resistance of 1200 ohms, the condenser 45 was about 1 mfd. In another embodiment where the magnet had a resistance of about 1500 ohms, the condenser was 0.5 mfd.

The wiring diagram for the embodiment shown in Figure 3 is substantially the same except that here there is no auxiliary switch. In this embodiment the speed is fixed and a separate switch (not shown) is used in the motor circuit.

With the construction as described, the contacts 31 and 33 are unable to open because of the attraction of the electromagnet 32, until the current through the magnet is preferably approximately zero. When this occurs, the contact points separate under the urging of the member 22 to restrict the motor speed to the predetermined maximum that is dependent upon the setting of the switch arms. As soon as the contact points 31 or 33 separate the vibratory frequency of the spring 30, which is substantially the frequency of the alternating current, causes the contact 31 to spring away from the contact 33 and then back again at substantially the same instant that the current curve through the magnet is again approximately the zero point. As the contacts 31 and 33 always open and close when the sine wave of current through the contacts is approaching zero in this embodiment, there is slight current flow through the switch including these contact points during this opening and closing.

In the preferred construction the spring 30 preferably has a fundamental half frequency slightly less than 120 cycles per second, say about 118 or 119. This is preferred so that the contact 31 will be closely adjacent to but approaching the other contact 33 when current begins to flow through the magnet. The magnet will then "pull" the contacts together and will effectively prevent or at least materially reduce the tendency of the contact 31 to "bounce" on the other contact as will occur if there is a brief lag.

In the preferred construction, the electromagnet 32 has a very large electrical resistance. This is preferably obtained by winding the armature 32a with a large number of turns of small diameter wire to produce the field 32b. Thus, in one embodiment the armature was wound with about ten thousand turns of No. 40 B & S gauge wire. With such a high resistance the electromagnet in series with the impedance can be put directly across the electrical line without undue heating or current consumption.

As the speed governor of this invention employs a reed having a frequency related to that of the alternating current, the governor reacts quite rapidly. This rapid operation serves to prevent or at least greatly minimize torque buck, which is caused by an oversupply of energy. The provision of the impedance in the circuit including the electromagnet causes the reed to open and close the contacts at selected points on the sine wave of current through the contacts. By varying the over-all impedance in this circuit as desired, any desired point on this sine wave may be chosen for the closing of the contacts. Thus, the invention is versatile for operation under widely varying conditions. Thus, in one embodiment of the invention, this opening of the contacts is brought about at a descending point on the sine wave while this point is approaching zero and then, although the exact point will vary depending upon load, speed, and other conditions, it will never go beyond the zero point unless desired.

The speed control switch of this invention eliminates extreme surges of power that occur with ordinary speed control switches. Furthermore, sparking in the contact points is greatly reduced and the motor runs extremely smoothly even at low speed and under extremely heavy load. The contacts also run considerably cooler. Thus, in one embodiment where an electromagnet and spring were not used the contacts reached a temperature of about 500° F. When the magnet and spring were used in the same motor the temperature in the same area was only about 100° F. Furthermore, the sparking was greatly reduced.

As is pointed out above, the auxiliary switch, including the contacts 34 and 35, in the adjustable speed control embodiment is used to break the circuit to the electromagnet 32 when the main switch is turned to the "off" position. If this were not done the current would always flow through the electromagnet.

The embodiment illustrated in Figure 3 is essentially similar to that shown in Figures 1, 2 and 4. Here, however, the main switch is not mounted for rotation but is fixed at a position arranged to provide a predetermined speed. Thus, in this embodiment the switch arm 123 is provided on its lower end with a flange 123a engaged by a screw 43 for holding the switch in place. This embodiment does not employ an auxiliary switch of the nature of that shown at 34 and 35 in the first illustrated embodiment.

Having described my invention as related to the embodiments shown in the accompanying drawings, it is my intention that the invention be not limited by any of the details of description, unless otherwise specified, but rather be construed broadly within its spirit and scope as set out in the accompanying claims.

We claim:

1. In an alternating current electric motor having speed control means including a member movable in response to the speed of the motor and a switch including a pair of contacts in series with the motor and operatively associated with said speed responsive member for opening and closing said contacts as a function of motor speed, apparatus comprising: an impedance circuit including an electromagnet operably associated with one of said contacts for effecting the opening and closing thereof, and connected in a parallel circuit with said motor circuit, said impedance structure having an impedance such that the alternating current sine wave through said electromagnet reaches a predetermined point while the alternating current sine wave through said contacts is at a predetermined point.

2. The apparatus of claim 1 wherein said electromagnet includes an armature wound with a large number of turns of small diameter wire to produce a high impedance.

3. The apparatus of claim 1 wherein said impedance circuit includes an impedance in series with said magnet.

4. The apparatus of claim 1 wherein said impedance circuit includes a condenser in series with said magnet.

5. The apparatus of claim 1 wherein said current through said electromagnet reaches an approximate zero point while said current through said contacts is at a predetermined point approaching zero.

6. In an alternating current electric motor having speed control means including a member movable in response to the speed of the motor and a switch including a pair of contacts in series with the motor and operatively associated with said speed responsive member for opening and closing said contacts as a function of motor speed, apparatus comprising: an impedance circuit including an electromagnet in a parallel circuit with said motor circuit, said impedance structure having an impedance such that the alternating current sine wave through said electromagnet reaches a predetermined point while the alternating current sine wave through said contacts is at a predetermined point, one of said contacts being operatively associated with said electromagnet; and a vibratory spring mounting said other contact for magnetic attraction toward said one contact by said magnet.

7. The apparatus of claim 6 wherein said spring has a natural vibratory frequency approximately that of said alternating current.

8. The apparatus of claim 6 wherein said impedance circuit includes an impedance in series with said magnet.

9. The apparatus of claim 6 wherein said impedance circuit includes a condenser in series with said magnet.

10. The apparatus of claim 6 wherein said current through said electromagnet reaches an approximate zero point while said current through said contacts is at a predetermined point approaching zero.

11. In an alternating current electric motor having speed control means including a member movable in response to the speed of the motor and a first switch including a pair of contacts in series with the motor and operatively associated with said speed responsive member for opening and closing said contacts as a function of motor speed, apparatus comprising: an impedance circuit including an electromagnet in a parallel circuit with said motor circuit, said impedance structure having an impedance such that the alternating current sine wave through said electromagnet reaches an approximate zero point while the alternating current sine wave through said contacts is at a descending point approaching zero, one of said contacts being operatively associated with said electromagnet; a vibratory spring mounting said other contact for magnetic attraction toward said one contact by said magnet; a second switch in series with said electromagnet; means for opening said first switch to stop the operation of the motor; and means for substantially simultaneously opening said second switch to break the circuit to the magnet.

12. In an alternating current electric motor having speed control means including a member movable in response to the speed of the motor and a switch including a pair of contacts in series with the motor and operatively associated with said speed responsive member for opening and closing said contacts as a function of motor speed, apparatus comprising: an electromagnet connected in parallel with said motor and associated with said contacts to tend to effect opening thereof when the alternating current sine wave through the contacts is at a predetermined point.

13. The apparatus of claim 12, wherein the current through said electromagnet reaches an approximate zero point while the current through said contacts is at a predetermined point approaching zero.

References Cited in the file of this patent

UNITED STATES PATENTS

| 1,918,203 | Wise | July 11, 1933 |
| 2,532,345 | Sparklin | Dec. 5, 1950 |